United States Patent
Zhang et al.

(10) Patent No.: US 11,747,703 B2
(45) Date of Patent: Sep. 5, 2023

(54) METHOD FOR DRIVING COLOR ELECTRONIC PAPER AND COLOR ELECTRONIC PAPER

(71) Applicants: Chongqing BOE Smart Electronics System Co., Ltd., Chongqing (CN); BOE TECHNOLOGY GROUP CO., LTD., Beijing (CN)

(72) Inventors: Shengbo Zhang, Beijing (CN); Lichun Chen, Beijing (CN); Qiangeng Cheng, Beijing (CN)

(73) Assignees: Chongqing BOE Smart Electronics System Co., Ltd., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 17/599,670

(22) PCT Filed: Feb. 2, 2021

(86) PCT No.: PCT/CN2021/074885
§ 371 (c)(1),
(2) Date: Sep. 29, 2021

(87) PCT Pub. No.: WO2021/196869
PCT Pub. Date: Oct. 7, 2021

(65) Prior Publication Data
US 2022/0317538 A1    Oct. 6, 2022

(30) Foreign Application Priority Data

Mar. 31, 2020  (CN) .......................... 202010245014.5

(51) Int. Cl.
*G09G 3/34*   (2006.01)
*G02F 1/1685* (2019.01)

(52) U.S. Cl.
CPC ........... *G02F 1/1685* (2019.01); *G09G 3/344* (2013.01)

(58) Field of Classification Search
None
See application file for complete search history.

(56) References Cited

U.S. PATENT DOCUMENTS

2008/0024431 A1   1/2008  Ishii
2010/0238158 A1   9/2010  Yoshida
(Continued)

FOREIGN PATENT DOCUMENTS

CN   101114424 A   1/2008
CN   101847370 A   9/2010
(Continued)

OTHER PUBLICATIONS

China Patent Office, First Office Action dated Dec. 15, 2020, for corresponding Chinese application No. 202010245014.5.
(Continued)

*Primary Examiner* — Matthew Yeung
(74) *Attorney, Agent, or Firm* — HOUTTEMAN LAW LLC

(57) ABSTRACT

The application provides a method for driving a color electronic paper, including: according to an image to be displayed, applying a first driving signal to a first electrode on a to-display-white microcapsule and a second driving signal to a first electrode on a to-display-black microcapsule. The first driving signal includes: a first sub-driving signal applied to the first electrode on the to-display-white microcapsule in display phase; and the first sub-driving signal is configured to drive a white particle in the to-display-white microcapsule to be closer to a display side than a black particle and a colored particle. The second driving signal comprises: a second sub-driving signal applied to the first
(Continued)

electrode on the to-display-black microcapsule in display phase, and the second sub-driving signal is configured to drive the black particle in the to-display-black microcapsule to be closer to the display side than the white particle and the colored particle.

15 Claims, 5 Drawing Sheets

(56) References Cited

U.S. PATENT DOCUMENTS

| | | | | |
|---|---|---|---|---|
| 2010/0309112 | A1* | 12/2010 | Rajagopal | G09G 3/344 345/107 |
| 2011/0175945 | A1 | 7/2011 | Lin | |
| 2012/0139967 | A1 | 6/2012 | Miyasaka et al. | |
| 2012/0200610 | A1 | 8/2012 | Sakamoto et al. | |
| 2015/0097877 | A1 | 4/2015 | Lin et al. | |
| 2016/0140909 | A1* | 5/2016 | Lin | G09G 3/344 345/107 |
| 2016/0225322 | A1 | 8/2016 | Sim et al. | |
| 2016/0351097 | A1* | 12/2016 | Sato | G09G 3/344 |
| 2017/0263176 | A1 | 9/2017 | Lin et al. | |
| 2019/0331979 | A1* | 10/2019 | Takada | G02F 1/167 |
| 2021/0142740 | A1 | 5/2021 | Gao et al. | |

FOREIGN PATENT DOCUMENTS

| | | |
|---|---|---|
| CN | 102129844 A | 7/2011 |
| CN | 102486916 A | 6/2012 |
| CN | 102636933 A | 8/2012 |
| CN | 105684073 A | 6/2016 |
| CN | 106782350 A | 5/2017 |
| CN | 107210023 A | 9/2017 |
| CN | 107393486 A | 11/2017 |
| CN | 108461066 A | 8/2018 |
| CN | 108806619 A | 11/2018 |
| CN | 110010080 A | 7/2019 |
| CN | 110140165 A | 8/2019 |
| CN | 110366747 A | 10/2019 |
| CN | 110780505 A | 2/2020 |
| CN | 111402818 A | 7/2020 |
| JP | 2019113742 A | 7/2019 |

OTHER PUBLICATIONS

China Patent Office, Second Office Action dated Apr. 12, 2021, for corresponding Chinese application No. 202010245014.5.
China Patent Office, Third Office Action dated Jul. 12, 2021, for corresponding Chinese application No. 202010245014.5.
China Patent Office, Rejection dated Nov. 18, 2021, for corresponding Chinese application No. 202010245014.5.

* cited by examiner

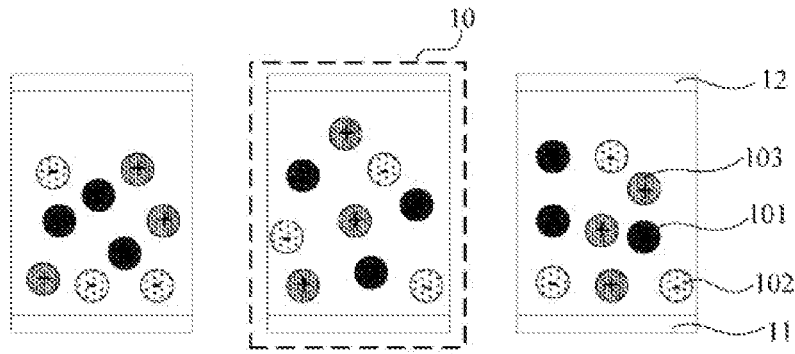

Fig. 1 according to an image to be displayed, applying a first driving signal to the first electrode on a to-display-white microcapsule and a second driving signal to the first electrode on a to-display- black microcapsule, wherein the first driving signal includes a first sub-driving signal applied to the first electrode in a display phase; and the first sub-driving signal is configured to drive the white particle in the microcapsule to be closer to a display side than the black particle and the yellow particle; the second driving signal includes a second sub-driving signal applied to the first electrode in the display phase, and the second sub-driving signal is configured to drive the black particle in the microcapsule to be closer to the display side than the white particle and the yellow particle; wherein a start time of an active voltage of the second sub-driving signal is not earlier than an end time of an active voltage of the first sub-driving signal.

METHOD FOR DRIVING COLOR ELECTRONIC PAPER AND COLOR ELECTRONIC PAPER

CROSS-REFERENCE TO RELATED APPLICATIONS

This application is a National Phase Application filed under 35 U.S.C. 371 as a national stage of PCT/CN2021/074885, filed on Feb. 2, 2021.

TECHNICAL FIELD

The present disclosure belongs to the field of electronic paper display technology, and particularly relates to a method for driving a color electronic paper and a color electronic paper.

BACKGROUND

Electronic paper (E-paper, also known as electronic ink) display devices have received extensive attention because of their eye-protecting and power-saving effects.

The electronic paper display device includes a plurality of microcapsules, and a first electrode and a second electrode disposed at both opposite sides of each of the microcapsules, in each of which electrophoretic particles including positively charged black and yellow particles and negatively charged white particles are encapsulated. The electronic paper display device controls the movement of the electrophoretic particles by controlling an electric field generated by the first and second electrodes. The microcapsule displays black when the electric field generated by the first and second electrodes drives the black particles to move to the top of the microcapsule; the microcapsule displays white when the electric field generated by the first and second electrodes drives the white particles to move to the top of the microcapsule; and the microcapsule displays yellow when the electric field generated by the first and second electrodes drives the yellow particles to move to the top of the microcapsule. Based on this, by controlling the plurality of microcapsules to display different colors, display can be achieved.

SUMMARY

To at least partially solve the problems in the existing art, the present disclosure provides a method for driving a color electronic paper, and a color electronic paper.

As a first aspect, an embodiment of the present disclosure provides a method for driving a color electronic paper. The color electronic paper includes a plurality of microcapsules, and a first electrode and a second electrode disposed at both opposite sides of each of the plurality of microcapsules, each of the plurality of microcapsules includes a white particle, a black particle, and a colored particle, an electrical polarity of a charge of the black particle and an electrical polarity of a charge of the white particle are opposite, the electrical polarity of the charge of the black particle and an electrical polarity of a charge of the colored particle are the same, and a charge-to-mass ratio of the black particle is greater than a charge-to-mass ratio of the colored particle. The method includes: applying a first driving signal to the first electrode on a to-display-white microcapsule and a second driving signal to the first electrode on a to-display-black microcapsule, according to an image to be displayed. The first driving signal includes: a first sub-driving signal applied to the first electrode in a display phase; and the first sub-driving signal is configured to drive the white particle in the to-display-white microcapsule to be closer to a display side than the black particle and the colored particle. The second driving signal includes: a second sub-driving signal applied to the first electrode in the display phase, and the second sub-driving signal is configured to drive the black particle in the to-display-black microcapsule to be closer to the display side than the white particle and the colored particle. A start time of an active voltage of the second sub-driving signal is not earlier than an end time of an active voltage of the first sub-driving signal.

In an embodiment, in the first display phase, the start time of the active voltage of the second sub-driving signal is the same as the end time of the active voltage of the first sub-driving signal.

In an embodiment, an absolute value of the active voltage of the first sub-driving signal is equal to an absolute value of the active voltage of the second sub-driving signal, and an electrical polarity of the active voltage of the first sub-driving signal is opposite to an electrical polarity of the active voltage of the second sub-driving signal.

In an embodiment, the second driving signal further includes a third sub-driving signal configured to drive the black particle in the to-display-black microcapsule to be closer to the display side than the white particle and the colored particle in the display phase. The third sub-driving signal is written into the first electrode on the to-display-black microcapsule after the second sub-driving signal is written into the first electrode on the to-display-black microcapsule.

In an embodiment, a value and a duration of an active voltage of the third sub-driving signal are the same as those of the second sub-driving signal.

In an embodiment, the method further includes: applying a third driving signal to the first electrode on a to-display-color microcapsule, according to a colored portion of the image to be displayed. The third driving signal includes a fourth sub-driving signal configured to drive the colored particle in the to-display-color microcapsule to be closer to the display side than the white particle and the black particle.

In an embodiment, the fourth sub-driving signal includes a plurality of pulse repetition units, each of which includes a first voltage, a zero voltage and a second voltage sequentially applied to the first electrode. The first voltage is configured to drive the white particle to be closer to the display side than the black particle and the colored particle, and the second voltage is configured to drive the colored particle to be closer to the display side than the white particle and the black particle.

In an embodiment, the fourth driving signal further includes a zero-voltage driving signal between two pulse repetition units.

In an embodiment, the third driving signal further includes a fifth sub-driving signal applied to the first electrode on the to-display-color microcapsule to drive the black particle in the to-display-color microcapsule to be closer to the display side than the white particle and the colored particle, while the second sub-driving signal is applied to the first electrode on the to-display-black microcapsule.

In an embodiment, a value of an active voltage of the fifth sub-driving signal are the same as those of the second sub-driving signal.

In an embodiment, the method further includes a balance phase prior to the display phase. The third driving signal further includes a sixth sub-driving signal applied to the first electrode on the to-display-color microcapsule in the balance phase. An electrical polarity of an active voltage of the sixth sub-driving signal is the same as an electrical polarity of an active voltage of the first voltage; a product of an absolute value of the active voltage of the sixth sub-driving signal and a duration of applying the active voltage of the sixth sub-driving signal is equal to a difference between a product of an absolute value of the first voltage and a duration of applying the first voltage and a product of an absolute value of the second voltage and a duration of applying the second voltage.

In an embodiment, the first driving signal includes a seventh sub-driving signal applied to the first electrode on the to-display-white microcapsule in the balance phase, the second driving signal includes an eighth sub-driving signal applied to the first electrode on the to-display-black microcapsule in the balance phase. An electrical polarity of an active voltage of the seventh sub-driving signal is opposite to an electrical polarity of the active voltage of the first sub-driving signal; and an electrical polarity of an active voltage of the eighth sub-driving signal is opposite to an electrical polarity of the active voltage of the second sub-driving signal. A product of an absolute value of the active voltage of the seventh sub-driving signal and a duration of applying the active voltage of the seventh sub-driving signal is equal to a product of an absolute value of an active voltage applied in the display phase and a duration of applying the active voltage in the display phase. A product of an absolute value of the active voltage of the eighth sub-driving signal and a duration of applying the active voltage of the eighth sub-driving signal is equal to a product of an absolute value of an active voltage applied in the display phase and a duration of applying the active voltage in the display phase.

In an embodiment, a shaking phase is included between the display phase and the balance phase, the first driving signal includes a ninth sub-driving signal in the shaking phase, the second driving signal includes a tenth sub-driving signal in the shaking phase, and the third driving signal includes an eleventh sub-driving signal in the shaking phase. Each of the ninth sub-driving signal, the tenth sub-driving signal, and the eleventh sub-driving signal includes a pulse signal having alternating positive and negative voltages.

In an embodiment, before applying the first driving signal to the first electrode corresponding to a white portion of the image to be displayed, the method further includes: detecting and feeding back an environment temperature to a processor to determine by the processor whether the detected environment temperature is within a preset temperature range; and applying the first driving signal to the first electrode on the to-display-white microcapsule in a case where the detected environment temperature is within the preset temperature range.

In an embodiment, the preset temperature range is larger than or equal to 40° C.

As a second aspect, a color electronic paper includes a plurality of microcapsules, and a first electrode and a second electrode disposed at both opposite sides of each of the plurality of microcapsules, each of the plurality of microcapsules including a white particle, a black particle, and a colored particle. An electrical polarity of a charge of the black particle and an electrical polarity of a charge of the white particle are opposite, the electrical polarity of the charge of the black particle and an electrical polarity of a charge of the colored particle are the same, and a charge-to-mass ratio of the black particle is greater than a charge-to-mass ratio of the colored particle. The color electronic paper further includes a processor, and the processor is configured to, according to an image to be displayed, apply a first driving signal to the first electrode on a to-display-white microcapsule and a second driving signal to the first electrode on a to-display-black microcapsule. The first driving signal includes: a first sub-driving signal applied to the first electrode in a display phase; and the first sub-driving signal is configured to drive the white particle in the to-display-white microcapsule to be closer to a display side than the black particle and the colored particle. The second driving signal includes: a second sub-driving signal applied to the first electrode in the display phase, and the second sub-driving signal is configured to drive the black particle in the to-display-black microcapsule to be closer to the display side than the white particle and the colored particle. A start time of an active voltage of the second sub-driving signal is not earlier than an end time of an active voltage of the first sub-driving signal.

In an embodiment, the color electronic paper further includes: a temperature sensor configured to detect and feed back an environment temperature to the processor to determine by the processor whether the detected environment temperature is within a preset range. The first driving signal is applied to the first electrode on the to-display-white microcapsule when the detected environment temperature is within the preset range.

As a third aspect, an embodiment of the present disclosure provides a computer readable medium having a computer program stored therein which, when being executed by a processor, causes the processor to implement the method for driving a color electronic paper.

BRIEF DESCRIPTION OF THE DRAWINGS

FIG. 1 is a schematic diagram illustrating a structure of a microcapsule;

FIG. 2 is a flowchart of a method for driving a color electronic paper according to an embodiment of the present disclosure;

DETAILED DESCRIPTION

Figure 3:
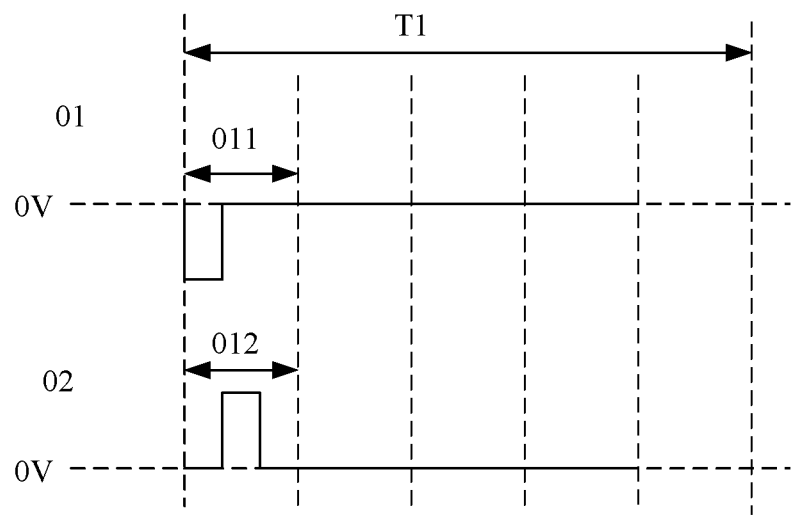
FIG. 3 is a timing diagram of a display phase of a method for driving a color electronic paper according to an embodiment of the present disclosure.

In order to enable those skilled in the art to better understand the technical solutions of the present disclosure, the present disclosure will be described in further detail below with reference to the accompanying drawings and specific embodiments.

Unless defined otherwise, technical or scientific terms used herein shall have the ordinary meaning as understood by one of ordinary skill in the art to which this disclosure belongs. The use of the terms "first", "second", and the like in this disclosure is not intended to indicate any order, quantity, or importance, but rather is used to distinguish one element from another. Also, the use of the terms "a", "an", or "the" and similar referents do not denote a limitation of quantity, but rather denote the presence of at least one. The word "include" or "comprise" and the like, means that the element or item preceding the word includes the element or item listed after the word and its equivalent, but does not exclude other elements or items. The terms "connect" or "couple" and the like are not limited to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

As shown in FIG. 1, an exemplary color electronic paper includes a plurality of microcapsules 10, and a first electrode 11 and a second electrode 12 disposed at both opposite sides of each of the plurality of microcapsules. Each of the plurality of microcapsules 10 includes charged particles in three colors, namely, white particles, black particles, and colored particles. The colored particles include, but are not limited to, yellow particles, and the colored particles are exemplified as the yellow particles 103 in the embodiments of the present disclosure. The electrical polarity of the charge of the black particle 101 and the electrical polarity of the charge of the white particle 102 are opposite, the electrical polarity of the charge of the black particle 101 and the electrical polarity of the charge of the yellow particle 103 are the same, and the charge-to-mass ratio of the black particle 101 is greater than that of the yellow particle 103.

It should be understood by those skilled in the art that, since the electrical polarity of the charge of the black particle 101 and the electrical polarity of the charge of the yellow particle 103 are the same and the charge-to-mass ratio of the black particle 101 is greater than that of the yellow particle 103, the moving speed of the black particle 101 is greater than that of the yellow particle 103 when a voltage is applied to the first electrode 11 and the second electrode 12 to generate an electric field.

It is to be noted herein that the positions of the first electrode 11 and the second electrode 12 at the both opposite sides of the microcapsule 10 are not limited; the first electrode 11 may be closer to the display side than the second electrode 12, that is, the side where the first electrode is located is the display side; alternatively, the second electrode 12 may be closer to the display side than the first electrode 11, that is, the side where the second electrode is located is the display side. In the embodiment of the present disclosure, an example in which the second electrode 12 is closer to the display side than the first electrode 11 is described, as shown in FIG. 1.

In addition, the second electrodes 12 corresponding to the microcapsules 10 may be electrically coupled together, in which case, the voltage signal applied to the second electrode 12 are the same, and in this case, the second electrodes 12 may be referred to as a common electrode (also referred to as a Vcom electrode); of course, the second electrodes 12 corresponding to the microcapsules 10 may not be electrically coupled together, and in this case, the voltage signals applied to the second electrodes 12 may be the same or different. In some embodiments, the second electrodes 12 may be grounded (i.e., 0V voltage).

The electrical polarity of the charge of the black particle 101, the electrical polarity of the charge of the white particle 102, and the electrical polarity of the charge of the yellow particle 103 are not limited, and the black particle 101 and the yellow particle 103 may be positively charged, and the white particle 102 may be negatively charged, alternatively, the black particle 101 and the yellow particle 103 may be negatively charged, and the white particle 102 may be positively charged. In the embodiment of the present disclosure, an example in which the black particle 101 and the yellow particle 103 are positively charged and the white particle 102 is negatively charged is described.

In the prior art, a color electronic paper capable of displaying black/white/yellow images is a bright electronic paper, which has bright colors and is favored by consumers. However, it has been found that this type of electronic paper has a problem of unclear display at a high temperature, and particularly, when a black-on-white image (for example, black characters on white background) is displayed, black portions are displayed and then white portions are displayed, resulting in that the white particles 102 in the white portions interfere with the display of the black particles 101 in the black portions, and the black portions are displayed in an unclear manner.

In view of the above problems, the following technical solutions are provided in the embodiments of the present disclosure.

In a first aspect, for the color electronic paper shown in FIG. 1, an embodiment of the present disclosure provides a method for driving the color electronic paper, as shown in FIGS. 2 and 3, including: S100, according to an image to be displayed, applying a first driving signal 01 to the first electrode 11 on the to-display-white microcapsule 10 and a second driving signal 02 to the first electrode 11 on the to-display-black microcapsule 10.

The first driving signal 01 includes a first sub-driving signal 011 applied to the first electrode 11 on the to-display-white microcapsule 10 in a display phase T1, and the first sub-driving signal 011 is configured to drive the white particle 102 in the to-display-white microcapsule 10 closer to the display side than the black particle 101 and the yellow particle 103 in the to-display-white microcapsule 10. That is, the first sub-driving signal 011 is applied to the first electrode 11 on the to-display-white microcapsule 10, and the first electrode 11 and the second electrode 12 generate an electric field to drive the white particle 102 to move toward the side of the second electrode 12, so that the side of the microcapsule 10 closer to the display side displays white, thereby realizing display of a white portion of the image to be displayed. It should be understood that, since the white particle 102 is negatively charged, the first sub-driving signal 011 applied to the first electrode 11 should be a negative voltage signal, and the voltage value should be sufficient to move the white particles 102.

The second driving signal 02 includes a second sub-driving signal 012 applied to the first electrode 11 on the to-display-black microcapsule 10 in a display phase T1, and the second sub-driving signal 012 is configured to drive the black particle 102 in the to-display-black microcapsule 10 closer to the display side than the white particle 102 and the yellow particle 103 in the to-display-black microcapsule 10. That is, the second sub-driving signal 012 is applied to the first electrode 11 on the to-display-black microcapsule 10, and the first electrode 11 and the second electrode 12 generate an electric field to drive the black particle 101 to move toward the side of the second electrode 12, so that the side of the microcapsule 10 closer to the display side displays black, thereby realizing display of a black portion of the image to be displayed. It should be understood that, since the black particle 101 is negatively charged, the second sub-driving signal 012 applied to the first electrode 11 should be a negative voltage signal, and the voltage value should be sufficient to move the black particles 101.

In particular, in the embodiment of the present disclosure, the start time of the active voltage of the second sub-driving signal 012 is not earlier than the end time of the active voltage of the first sub-driving signal 011. That is to say, in the display phase T1, the color electronic paper displays the white portion of the image to be displayed first, and displays the black portion after the display of the white portion is completed, thereby effectively avoiding the problem that the black portion is interfered by the white portion to cause the unclear black display in the existing art in which the white portion is displayed after the black portion is displayed.

In some embodiments, the start time of the active voltage of the second sub-driving signal 012 is the end time of the active voltage of the first sub-driving signal 011. That is to say, the black portion of the image to be displayed is displayed immediately after the display of the white portion of the image to be displayed is completed on the color electronic paper, so that the refreshing rate is effectively increased, and the display effect of the color electronic paper is better.

Of course, it is sufficient that the start time of the second sub-driving signal 012 is not earlier than the end time of the first sub-driving signal 011. For example, the second driving signal 02 may further include a zero-voltage signal written to the first electrode 11 in the display phase T1, and the zero-voltage signal is written before the start time of the second sub-driving signal 012, in which case, the black portion of the image to be displayed is displayed at a certain time interval after the display of the white portion of the image to be displayed is completed, and the time interval is determined by the duration of the zero-voltage signal of the second driving signal 02 before the second sub-driving signal 012 is inputted in the display phase T1.

Figure 4:
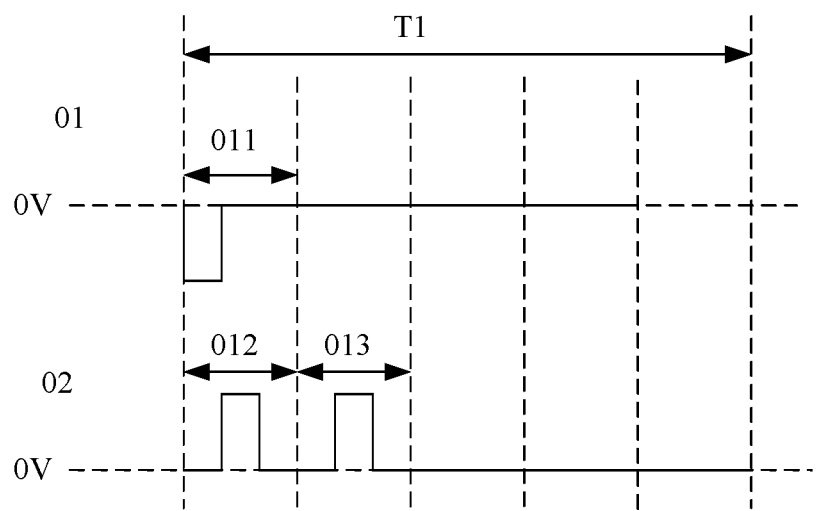
FIG. 4 is another timing diagram of a display phase of a method for driving a color electronic paper according to an embodiment of the present disclosure.

In some embodiments, as shown in FIG. 4, the second driving signal 02 further includes a third sub-driving signal 013, the third sub-driving signal 013 is configured to drive the black particle 101 in the to-display-black microcapsule 10 again to be closer to the display side than the white particle 102 and the yellow particle 103 after the second sub-driving signal 012 drives the to-display-black microcapsule 10 to display black. In this way, when displaying the image to be displayed, the black particle 101 in the to-display-black microcapsule 10 is driven to move twice, so that the problem of unclear display of the black portion is further effectively avoided.

It is to be noted herein that the second sub-driving signal 012 and the third sub-driving signal 013 of the second driving signal 02 generally include a zero-voltage driving signal (i.e., 0V voltage) for a period of time therebetween, that is, after the second sub-driving signal 012 is applied to the first electrode 11 on the to-display-black microcapsule 10 and the black particle 101 in the microcapsule 10 is closer to the display side than the white particle 102 and the yellow particle 103, the application of the voltage to the first electrode 11 on the microcapsule 10 is stopped, then, when the third sub-driving signal 013 is applied again to the first electrode 11 on the microcapsule 10, the black particle 101 is driven again to ensure as much as possible that all black particles 101 in the microcapsules 10 are closer to the display side than the white particles 102 and the yellow particles 103, which greatly reduces the chance that the black particles 101 are disturbed by the white particles 102.

The values of the active voltages and the durations of the active voltages of the third sub-driving signal 013 and the second sub-driving signal 012 are the same, so as to ensure that the black displayed by the to-display-black microcapsule 10 is more uniform.

Figure 5:
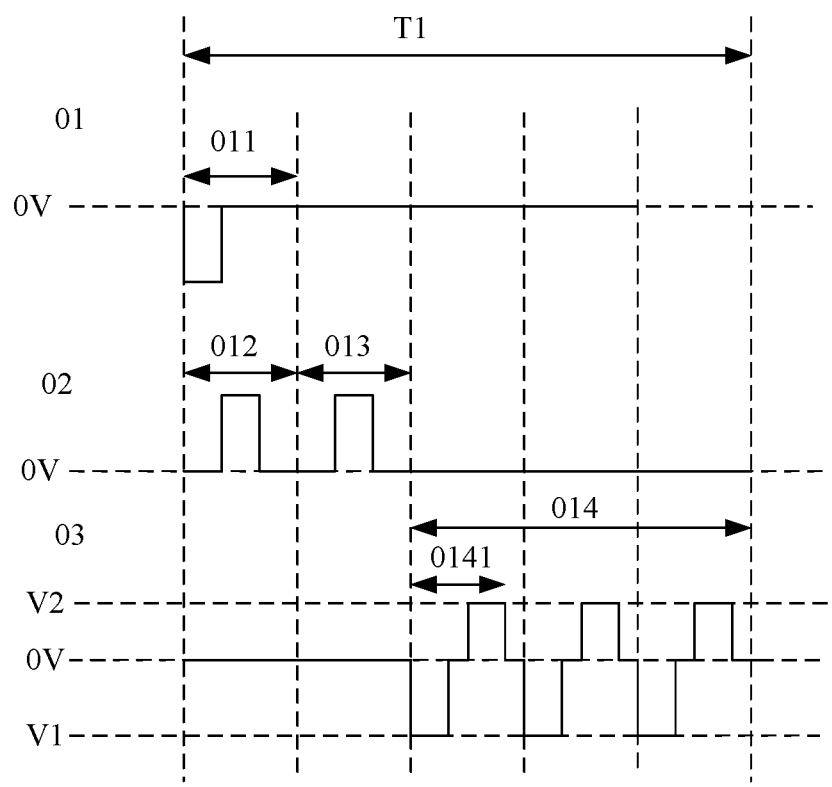
FIG. 5 is another timing diagram of a display phase of a method for driving a color electronic paper according to an embodiment of the present disclosure.

In some embodiments, the method for driving the color electronic paper includes not only the above steps but also a step of applying a third driving signal 03 to the first electrode 11 on the to-display-yellow microcapsule 10. As shown in FIG. 5, the third driving signal 03 includes a fourth sub-driving signal 014 applied to the first electrode 11 in the display phase T1, and the fourth sub-driving signal 014 is configured to drive the yellow particle 103 in the to-display-yellow microcapsule 10 to be closer to the display side than the white particle 102 and the black particle 101, so that the microcapsule 10 corresponding to the yellow portion displays yellow.

In some embodiments, the fourth sub-driving signal 014 includes at least one pulse repetition unit 0141; each pulse repetition unit 0141 includes a first voltage V1, a zero voltage (0V) and a second voltage V2 sequentially applied to the first electrode; where the first voltage V1 is configured to drive the white particle 102 to be closer to the display side than the black particle 101 and the yellow particle 103 and the second voltage V2 is configured to drive the yellow particle 103 to be closer to the display side than the white particle 102 and the black particle 101.

It should be noted that, since the charge-to-mass ratio of the yellow particle 103 is smaller than that of the black particle 101, the voltage value of the second voltage for driving the yellow particle 103 to move is smaller than that of the active voltage of the second sub-driving signal 012, and therefore the fourth sub-driving signal 014 in the embodiment of the present disclosure includes a plurality of pulse repetition units 0141 to make the yellow portion of the image to be displayed have uniform display effect.

When the to-display-yellow microcapsule 10 of the color electronic paper is driven, the first voltage is applied to the first electrode 11 before the second voltage is applied to the first electrode 11, the white particle 102 is driven by the first voltage to move to be closer to the display side than the black particle 101 and the yellow particle 103, then the microcapsule 10 corresponding to the yellow portion stands still by the zero voltage, so that the yellow portion of the image to be displayed displays white, and finally the second voltage is applied to the first electrode 11, and the yellow particle 103 is driven to move to be closer to the display side than the white particle 102 and the black particle 101, so that the white particle 102 is adjacent to the yellow particle 103, and thus, when yellow is displayed through the yellow particle 103, the problem that yellow is too bright is relieved by the white particle 102, so that the yellow portion is more gentle.

In some embodiments, as shown in FIG. 5, the fourth sub-driving signal 014 further includes a zero-voltage driving signal (i.e., 0V voltage) between two repetition pulse units 0141, that is, after the second voltage of the pulse repetition unit 0141 is applied to the first electrode 11 corresponding to the yellow portion of the image to be displayed, a zero voltage is applied to the first electrode 11 to make each particle in the to-display-yellow microcapsule 10 stand still, and finally the signal of the pulse repetition unit 0141 is applied to the first electrode 11 corresponding to the yellow portion to make the yellow portion display more uniformly.

Figure 6:
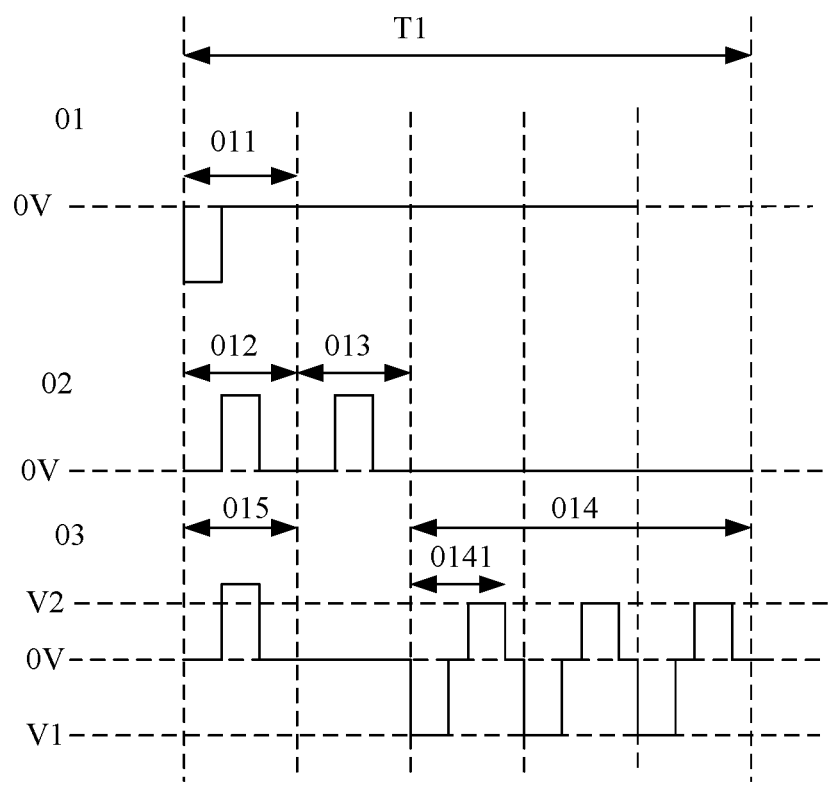
FIG. 6 is another timing diagram of a display phase of a method for driving a color electronic paper according to an embodiment of the present disclosure.

In some embodiments, the third driving signal 03 further includes a fifth sub-driving signal 015 applied to the first electrode 11 corresponding to the yellow portion when the second sub-driving signal 012 is applied to the first electrode 11 on the to-display-yellow microcapsule 10, and as shown in FIG. 6, the fifth sub-driving signal 015 is configured to drive the black particle 101 in the to-display-yellow microcapsule 10 to be closer to the display side than the yellow particle 103 and the white particle 102 while the to-display-black microcapsule 10 displays black in the display phase T1. In short, the to-display-yellow microcapsule 10 in the display phase T1 displays black before displaying yellow, so that the problem of unclear display of black in the black-on-yellow image can be avoided.

Figure 7:
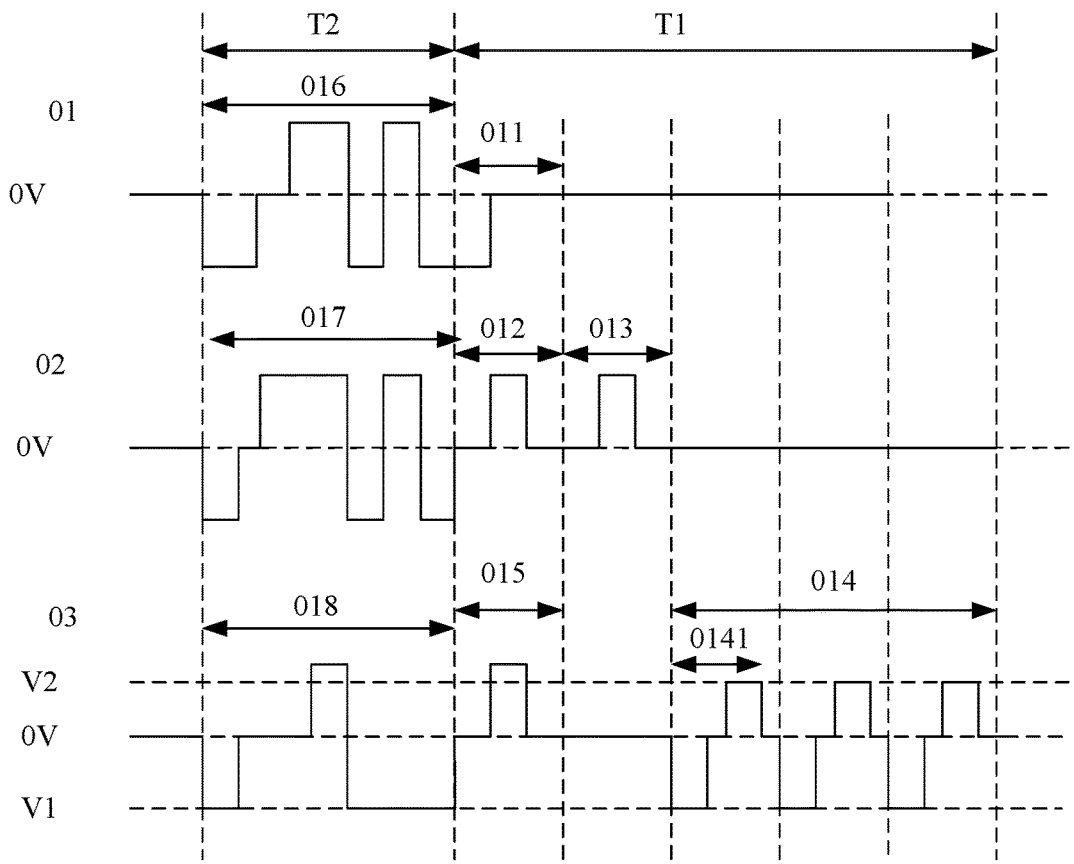
FIG. 7 is a timing diagram of a display phase and a balance phase of a method for driving a color electronic paper according to an embodiment of the present disclosure.

In some embodiments, as shown in FIG. 7, the method for driving the color electronic paper further includes a balance phase T2 prior to the display phase T1, and in a case where the third driving signal 03 includes the fourth sub-driving signal 014, the fourth sub-driving signal 014 includes the at least one pulse repetition unit 0141, and each pulse repetition unit 0141 includes the first voltage V1, the zero voltage (0V) and the second voltage V2 sequentially applied to the first electrode, the third driving signal 03 further includes a sixth sub-driving signal 018 applied to the first electrode 11 in the balance phase T2; where the electrical polarity of the active voltage of the sixth sub-driving signal 018 is the same as that of the first voltage V1; the product of the absolute value of the active voltage of the sixth sub-driving signal 018 and the duration of applying the active voltage is equal to the difference between the product of the absolute value of the first voltage of the fourth sub-driving signal 014 and the duration of applying the first voltage of the fourth sub-driving signal 014 and the product of the absolute value of the second voltage of the fourth sub-driving signal 014 and the duration of applying the second voltage of the fourth sub-driving signal 014.

Since the first voltage is a negative voltage and the second voltage is a positive voltage in the embodiment of the present disclosure, the electrical polarity of the active voltage of the sixth sub-driving signal 018 is negative; it should be understood that in a case where the first voltage is a positive voltage, the electrical polarity of the active voltage of the sixth sub-driving signal 018 is positive.

Since the balance phase T2 is introduced before the display phase T1 in the embodiment of the present disclosure, and the product of the absolute value of the active voltage of the sixth sub-driving signal 018 applied to the first electrode 11 by the third driving signal 03 in the balance phase T2 and the duration of applying the active voltage is equal to the difference between the product of the absolute value of the first voltage of the fourth sub-driving signal 014 and the duration of applying the first voltage of the fourth sub-driving signal 014 and the product of the absolute value of the second voltage of the fourth sub-driving signal 014 and the duration of applying the second voltage of the fourth sub-driving signal 014, the voltage of the third driving signal 03 in the display phase T1 can be balanced, and the white particles 102, the black particles 101 and the yellow particles 103 in the to-display-yellow microcapsule 10 in the image to be displayed are prevented from generating a built-in electric field and further causing polarization due to an unbalanced electric field.

In the embodiment of the present disclosure, the active voltage of the sixth sub-driving signal 018 may be equal to the first voltage, or may not be equal to the first voltage, and FIG. 7 illustrates that the active voltage of the sixth sub-driving signal 018 is equal to the first voltage as an example.

In the embodiment of the present disclosure, the active voltage of the sixth sub-driving signal 018 is equal to the first voltage, so that the voltage of the third driving signal 03 in the display phase T1 can be further balanced, and the time sum of the positive voltage and the negative voltage can be maintained, thereby more effectively preventing the white particles 102, the black particles 101, and the yellow particles 103 in the to-display-yellow microcapsule 10 in the image to be displayed from generating a built-in electric field and further causing polarization due to the unbalance of the electric field.

As shown in FIG. 7, in a case where the first driving signal 01 applied to the first electrode 11 on the to-display-white microcapsule 10 includes the first sub-driving signal 011, and the second driving signal 02 applied to the first electrode 11 on the to-display-black microcapsule 10 includes the second sub-driving signal 012, the first driving signal 01 further includes a seventh sub-driving signal 016 applied to the first electrode 11 in the balance phase T2, and the second driving signal 02 includes an eighth sub-driving signal 017 applied to the first electrode 11 in the balance phase T2; where the electrical polarity of the active voltage of the seventh sub-driving signal 016 is opposite to the electrical polarity of the active voltage of the first sub-driving signal 011; the active voltage of the eighth sub-driving signal 017 is opposite to the active voltage of the second sub-driving signal 012; moreover, the product of the absolute value of the active voltage of the first driving signal 01 (i.e., the active voltage of the seventh sub-driving signal 016) during the balance phase T2 and the duration of applying the active voltage is equal to the product of the absolute value of the active voltage of the first driving signal 01 and the duration of applying the active voltage during the display phase T1; the product of the absolute value of the active voltage of the second driving signal 02 (active voltage of the eighth sub-driving signal 017) during the balance phase T2 and the duration of applying the active voltage is equal to the product of the absolute value of the active voltage and the duration of applying the active voltage during the display phase T1.

In a case where the active voltage of the first driving signal 01 in the display phase T1 is a positive voltage, the active voltage of the first driving signal 01 in the balance phase T2 is a negative voltage; and in a case where the active voltage of the first driving signal 01 in the display phase T1 is a negative voltage, the active voltage of the first driving signal 01 in the balance phase T2 is a positive voltage. For the polarity relationship between the second driving signal 02 in the balance phase T2 and the second driving signal 02 in the display phase T1, the first driving signal 01 can be referred to, and therefore, the description thereof is omitted.

In the embodiment of the present disclosure, the balance phase T2 is introduced before the display phase T1, and the product of the absolute value of the active voltage of the first driving signal 01 (i.e., the active voltage of the seventh sub-driving signal 016) during the balance phase T2 and the duration of applying the active voltage is equal to the product of the absolute value of the active voltage of the first driving signal 01 and the duration of applying the active voltage during the display phase T1; the product of the absolute value of the active voltage of the second driving signal 02 (active voltage of the eighth sub-driving signal 017) during the balance phase T2 and the duration of applying the active voltage is equal to the product of the absolute value of the active voltage and the duration of applying the active voltage during the display phase T1. As such, the white particles 102, the black particles 101 and the yellow particles 103 in the microcapsules 10 to display black or white in the image to be displayed are effectively prevented from generating a built-in electric field and further causing polarization due to the unbalance of the electric field.

Here, the absolute values of the active voltages of the first driving signal 01 in the display phase T1 and the balance phase T2 may be equal or may not be equal; similarly, the same applies to the second driving signal 02. FIG. 7 illustrates that the absolute values of the active voltages of the first driving signal 01 or the second driving signal 02 in the display phase T1 and the balance phase T2 are equal, as an example.

It should be further noted that the eighth sub-driving signal 017 of the second driving signal 02 in the balance phase T2 in FIG. 7 is illustrated by taking an example in which the second driving signal 02 only includes the second sub-driving signal 012 in the display phase T1, and in a case where the second driving signal 02 also includes the third sub-driving signal 013 in the display phase T1, the waveform of the eighth sub-driving signal 017 in the balance phase T2 should be adjusted according to the voltage relationship between the balance phase T2 and the display phase.

In the embodiment of the present disclosure, the absolute values of the active voltages of the first driving signal 01 or the second driving signal 02 in the display phase T1 and the balance phase T2 are equal, so that the voltages of the first driving signal 01 and the second driving signal 02 in the display phase T1 can be further balanced, and the time sum of the positive voltage and the negative voltage is maintained, thereby more effectively preventing the white particles 102, the black particles 101 and the yellow particles 103 in the microcapsules 10 to display white or black in the image to be displayed from generating a built-in electric field and further causing polarization due to the unbalance of the electric field.

Figure 8:
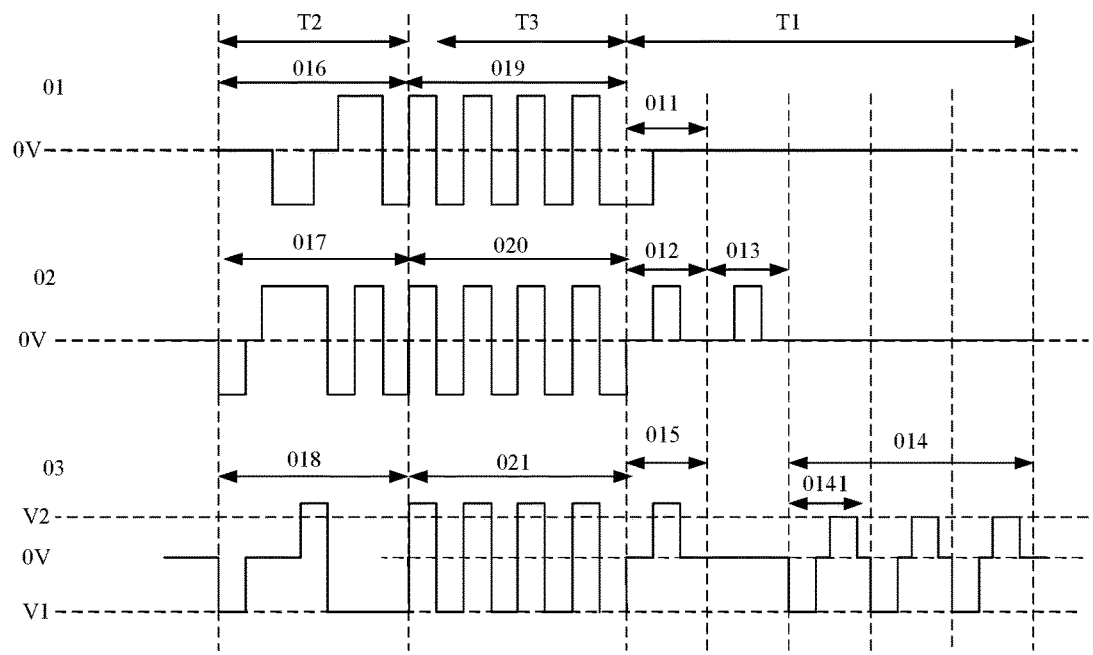
FIG. 8 is a timing diagram of a display phase, a shaking phase and a balance phase of a method for driving a color electronic paper according to an embodiment of the present disclosure.

In some embodiments, as shown in FIG. 8, a shaking phase T3 is further included between the display phase T1 and the balance phase T2, and the first, second and third driving signals 01, 02 and 03 respectively include the ninth, tenth and eleventh sub-driving signals 019, 020 and 021 in the shaking phase T3; the ninth sub-driving signal 019, the tenth sub-driving signal 020 and the eleventh sub-driving signal 021 each includes a pulse signal with alternating positive and negative voltages.

Here, the cycles of the pulse signal of each of the ninth sub-driving signal 019, the tenth sub-driving signal 020 and the eleventh drive sub-driving signal 021 are not limited, and may be specifically set according to the requirement. FIG. 8 only shows an example in which four cycles are included.

In the embodiment of the present disclosure, since the shaking phase T3 is introduced between the display phase T1 and the balance phase T2, and the first, second and third driving signals 01, 02 and 03 respectively include the ninth, tenth and eleventh sub-driving signals 019, 020 and 021 in the shaking phase T3; the ninth sub-driving signal 019, the tenth sub-driving signal 020 and the eleventh sub-driving signal 021 each includes a pulse signal with alternating positive and negative voltages, so that the white particles 102, the black particles 101 and the yellow particles 103 in each microcapsule 10 are fully separated and uniformly mixed in the shaking phase T3 to move quickly and accurately in the display phase T1, thereby achieving a better display effect.

In some embodiments, the method for driving the color electronic paper further includes detecting an environment temperature, and determining whether the environment temperature is greater than a preset value, and when the environment temperature is greater than or equal to the preset value, applying a first driving signal 01 to the first electrode 11 on the to-display-white microcapsule 10 in the image to be displayed, and applying a second driving signal 02 to the first electrode 11 on the to-display-black microcapsule 10 in the image to be displayed according to the image to be displayed; where the first driving signal 01 includes a first sub-driving signal 011 applied to the first electrode 11 on the to-display-white microcapsule 10 in the display phase T1, the first sub-driving signal 011 is configured to drive the white particles 102 in the to-display-white microcapsule 10 closer to the display side than the black particles 101 and the yellow particles 103; the second driving signal 02 includes a second sub-driving signal 012 applied to the first electrode 11 on the to-display-black microcapsule 10 in the display phase T1, the second sub-driving signal 012 is configured to drive the black particles 101 in the to-display-black microcapsule 10 closer to the display side than the white particles 102 and the yellow particles 103; the start time of the second sub-driving signal 012 is not earlier than the end time of the first sub-driving signal 011. That is, in the display phase T1, the color electronic paper displays the white portion of the image to be displayed first, and displays the black portion after displaying the white portion is completed.

When the environment temperature is greater than or equal to the preset value, the start time of the first sub-driving signal 011 applied to the first electrode 11 corresponding to the white portion is not earlier than the end time of the second sub-driving signal 012. That is, in the display phase T1, the color electronic paper displays the black portion of the image to be displayed first, and displays the white portion after displaying the black portion is completed.

Here, the preset value of the environment temperature includes, but is not limited to, 40° C.

Figure 9:
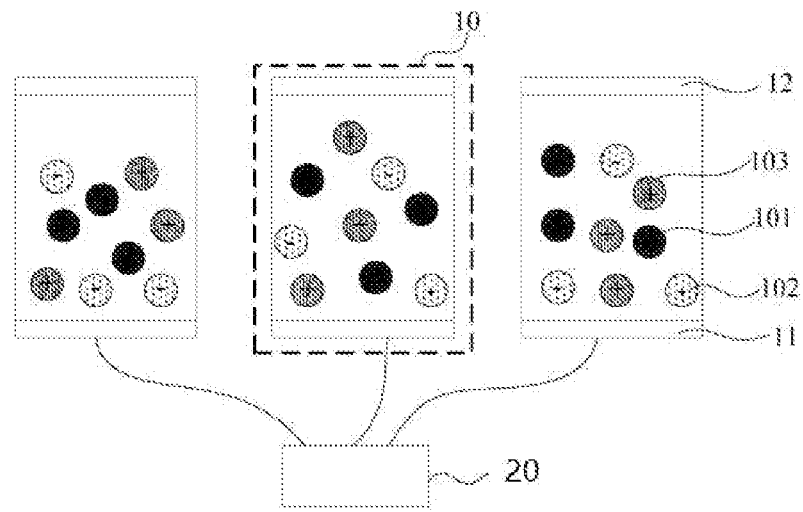
FIG. 9 is a schematic diagram illustrating a structure of a color electronic paper according to an embodiment of the present disclosure.

In a second aspect, as shown in FIG. 9, the present disclosure provides a color electronic paper, including a plurality of microcapsules 10, and a first electrode 11 and a second electrode 12 disposed at both opposite sides of each of the plurality of microcapsules. Each of the plurality of microcapsules 10 includes charged particles in three colors, namely, white particles, black particles, and colored particles. The colored particles include, but are not limited to, yellow particles, and the colored particles are exemplified as the yellow particles 103 in the embodiments of the present disclosure. The electrical polarity of the charge of the black particle 101 and the electrical polarity of the charge of the white particle 102 are opposite, the electrical polarity of the charge of the black particle 101 and the electrical polarity of the charge of the yellow particle 103 are the same, and the charge-to-mass ratio of the black particle 101 is greater than that of the yellow particle 103.

The color electronic paper in the embodiment of the present disclosure further includes a processor 20, which applies a first driving signal 01 to the first electrode 11 on the to-display-white microcapsule 10 in an image to be displayed, and applies a second driving signal 02 to the first electrode 11 on the to-display-black microcapsule 10 in the image to be displayed, according to the image to be displayed; here, the first driving signal 01 and the second driving signal 02 may be driving signals in the above driving method, and a description thereof will not be repeated. Thus, in the color electronic paper in the embodiment of the present disclosure, in the display phase T1, the to-display-white microcapsule 10 in the image to be displayed is driven to display, and then the to-display-black microcapsule 10 in the image to be displayed is driven to display after displaying white portion is completed, so that a problem in the prior art that the display of black is not clear because a white portion is displayed after a black portion is displayed and the black portion is interfered by the white portion is effectively avoided.

The processor in the embodiment of the present disclosure is further configured to apply a third driving signal 03 to the first electrode 11 on the to-display-yellow microcapsule in the image to be displayed, where the third driving signal 03 may be a driving signal in any one of the driving methods described above, and therefore, the description is not repeated here.

Figure 10:
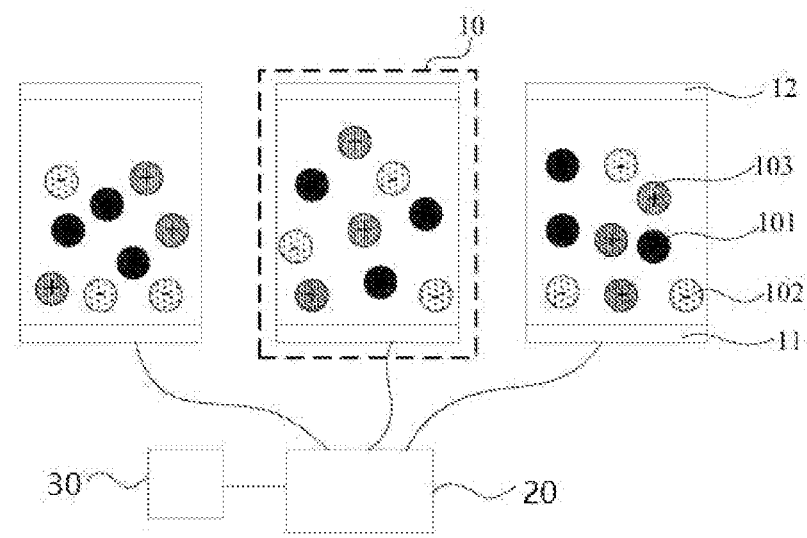
FIG. 10 is a schematic diagram illustrating a structure of a color electronic paper according to an embodiment of the present disclosure.

In some embodiments, as shown in FIG. 10, the color electronic paper further includes a temperature sensor 30, which is configured to detect an environment temperature and return the environment temperature to the processor, so that the processor adjusts the driving waveforms of the first driving signal 01, the second driving signal 02, and the third driving signal 03 according to the environment temperature.

It is to be noted that, for the explanation and effect of the processor, reference may be made to the method for driving the color electronic paper, and the description thereof will not be repeated here.

In a third aspect, an embodiment of the present disclosure provides a computer-readable medium having a computer program stored therein, where the program, when executed by a processor, implements any one of the above-mentioned methods for driving the color electronic paper.

It will be understood by those of ordinary skill in the art that all or some of the steps of the methods, systems, and functional modules/units in devices disclosed above may be implemented as software, firmware, hardware, or suitable combinations thereof. In a hardware implementation, the division between functional modules/units mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on computer readable media, which may include computer storage media (or non-transitory media) and communication media (or transitory media). The term "computer storage media" includes volatile and nonvolatile, removable and non-removable media implemented in any method or technology for storage of information such as computer readable instructions, data structures, program modules or other data, as is well known to those skilled in the art. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by a computer. In addition, communication media typically embodies computer readable instructions, data structures, program modules or other data in a modulated data signal such as a carrier wave or other transport mechanism and includes any information delivery media as is well known to those skilled in the art.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

What is claimed is:

1. A method for driving a color electronic paper, wherein the color electronic paper comprises a plurality of microcapsules, and a first electrode and a second electrode disposed at both opposite sides of each of the plurality of microcapsules, each of the plurality of microcapsules comprises a white particle, a black particle, and a colored particle, an electrical polarity of a charge of the black particle and an electrical polarity of a charge of the white particle are opposite, the electrical polarity of the charge of the black particle and an electrical polarity of a charge of the colored particle are the same, and a charge-to-mass ratio of the black particle is greater than a charge-to-mass ratio of the colored particle, the method comprises:
applying a first driving signal to the first electrode on a to-display-white microcapsule and a second driving signal to the first electrode on a to-display-black microcapsule, according to an image to be displayed,
wherein,
the first driving signal comprises: a first sub-driving signal applied to the first electrode in a display phase; and the first sub-driving signal is configured to drive the white particle in the to-display-white microcapsule to be closer to a display side than the black particle and the colored particle;
the second driving signal comprises: a second sub-driving signal applied to the first electrode in the display phase, and the second sub-driving signal is configured to drive the black particle in the to-display-black microcapsule to be closer to the display side than the white particle and the colored particle; and
a start time of an active voltage of the second sub-driving signal is not earlier than an end time of an active voltage of the first sub-driving signal,
wherein the second driving signal further comprises a third sub-driving signal configured to drive the black particle in the to-display-black microcapsule to be closer to the display side than the white particle and the colored particle in the display phase;
wherein the third sub-driving signal is written into the first electrode on the to-display-black microcapsule after the second sub-driving signal is written into the first electrode on the to-display-black microcapsule,
wherein a value and a duration of an active voltage of the third sub-driving signal are the same as those of the second sub-driving signal, and
wherein a value and a duration of an active voltage of the third sub-driving signal are the same as those of the second sub-driving signal.

2. The method of claim 1, wherein the start time of the active voltage of the second sub-driving signal is the same as the end time of the active voltage of the first sub-driving signal.

3. The method of claim 1, wherein an absolute value of the active voltage of the first sub-driving signal is equal to an absolute value of the active voltage of the second sub-driving signal, and an electrical polarity of the active voltage of the first sub-driving signal is opposite to an electrical polarity of the active voltage of the second sub-driving signal.

4. A method for driving a color electronic paper, wherein the color electronic paper comprises a plurality of microcapsules, and a first electrode and a second electrode disposed at both opposite sides of each of the plurality of microcapsules, each of the plurality of microcapsules comprises a white particle, a black particle, and a colored particle, an electrical polarity of a charge of the black particle and an electrical polarity of a charge of the white particle are opposite, the electrical polarity of the charge of the black particle and an electrical polarity of a charge of the colored particle are the same, and a charge-to-mass ratio of the black particle is greater than a charge-to-mass ratio of the colored particle,
the method comprises:
applying a first driving signal to the first electrode on a to-display-white microcapsule and a second driving signal to the first electrode on a to-display-black microcapsule, according to an image to be displayed,
wherein,
the first driving signal comprises: a first sub-driving signal applied to the first electrode in a display phase; and the first sub-driving signal is configured to drive the white particle in the to-display-white microcapsule to be closer to a display side than the black particle and the colored particle;
the second driving signal comprises: a second sub-driving signal applied to the first electrode in the display phase, and the second sub-driving signal is configured to drive the black particle in the to-display-black microcapsule to be closer to the display side than the white particle and the colored particle; and
a start time of an active voltage of the second sub-driving signal is not earlier than an end time of an active voltage of the first sub-driving signal,
wherein method further comprises:
applying a third driving signal to the first electrode on a to-display-color microcapsule, according to a colored portion of the image to be displayed, wherein the third driving signal comprises a fourth sub-driving signal configured to drive the colored particle in the to-display-color microcapsule to be closer to the display side than the white particle and the black particle,
wherein the fourth sub-driving signal comprises a plurality of pulse repetition units, each of which comprises a first voltage, a zero voltage and a second voltage sequentially applied to the first electrode;
the first voltage is configured to drive the white particle to be closer to the display side than the black particle and the colored particle, and the second voltage is configured to drive the colored particle to be closer to the display side than the white particle and the black particle.

5. The method of claim 4, wherein the fourth driving signal further comprises a zero-voltage driving signal between two pulse repetition units.

6. The method of claim 4, wherein the third driving signal further comprises a fifth sub-driving signal applied to the first electrode on the to-display-color microcapsule to drive the black particle in the to-display-color microcapsule to be closer to the display side than the white particle and the colored particle, while the second sub-driving signal is applied to the first electrode on the to-display-black microcapsule.

7. The method of claim 6, wherein a value and a duration of an active voltage of the fifth sub-driving signal are the same as those of the second sub-driving signal.

8. The method of claim 4, further comprising a balance phase prior to the display phase, wherein the third driving signal further comprises a sixth sub-driving signal applied to the first electrode on the to-display-color microcapsule in the balance phase; wherein an electrical polarity of an active voltage of the sixth sub-driving signal is the same as an electrical polarity of an active voltage of the first voltage; a product of an absolute value of the active voltage of the sixth sub-driving signal and a duration of applying the active voltage of the sixth sub-driving signal is equal to a difference between a product of an absolute value of the first voltage and a duration of applying the first voltage and a product of an absolute value of the second voltage and a duration of applying the second voltage.

9. The method of claim 8, wherein the first driving signal comprises a seventh sub-driving signal applied to the first electrode on the to-display-white microcapsule in the balance phase, the second driving signal comprises an eighth sub-driving signal applied to the first electrode on the to-display-black microcapsule in the balance phase; wherein an electrical polarity of an active voltage of the seventh sub-driving signal is opposite to an electrical polarity of the active voltage of the first sub-driving signal; and an electrical polarity of an active voltage of the eighth sub-driving signal is opposite to an electrical polarity of the active voltage of the second sub-driving signal;
a product of an absolute value of the active voltage of the seventh sub-driving signal and a duration of applying the active voltage of the seventh sub-driving signal is equal to a product of an absolute value of an active voltage applied in the display phase and a duration of applying the active voltage in the display phase; and
a product of an absolute value of the active voltage of the eighth sub-driving signal and a duration of applying the active voltage of the eighth sub-driving signal is equal to a product of an absolute value of an active voltage applied in the display phase and a duration of applying the active voltage in the display phase.

10. The method of claim 9, further comprising a shaking phase between the display phase and the balance phase, the first driving signal comprises a ninth sub-driving signal in the shaking phase, the second driving signal comprises a tenth sub-driving signal in the shaking phase, and the third driving signal comprises an eleventh sub-driving signal in the shaking phase, wherein each of the ninth sub-driving signal, the tenth sub-driving signal, and the eleventh sub-driving signal comprises a pulse signal having alternating positive and negative voltages.

11. The method of claim 1, before applying the first driving signal to the first electrode corresponding to a white portion of the image to be displayed, further comprising:
detecting and feeding back an environment temperature to a processor to determine by the processor whether the detected environment temperature is within a preset temperature range, and
applying the first driving signal to the first electrode on the to-display-white microcapsule, in a case where the detected environment temperature is within the preset temperature range.

12. The method of claim 11, wherein the preset temperature range is larger than or equal to 40° C.

13. A color electronic paper comprising a plurality of microcapsules, and a first electrode and a second electrode disposed at both opposite sides of each of the plurality of microcapsules, each of the plurality of microcapsules comprising a white particle, a black particle, and a colored particle, wherein an electrical polarity of a charge of the black particle and an electrical polarity of a charge of the white particle are opposite, the electrical polarity of the charge of the black particle and an electrical polarity of a charge of the colored particle are the same, and a charge-to-mass ratio of the black particle is greater than a charge-to-mass ratio of the colored particle;

the color electronic paper further comprises a processor, wherein the processor is configured to, according to an image to be displayed, apply a first driving signal to the first electrode on a to-display-white microcapsule and a second driving signal to the first electrode on a to-display-black microcapsule;

the first driving signal comprises: a first sub-driving signal applied to the first electrode in a display phase; and the first sub-driving signal is configured to drive the white particle in the to-display-white microcapsule to be closer to a display side than the black particle and the colored particle;

the second driving signal comprises: a second sub-driving signal applied to the first electrode in the display phase, and the second sub-driving signal is configured to drive the black particle in the to-display-black microcapsule to be closer to the display side than the white particle and the colored particle; and a start time of an active voltage of the second sub-driving signal is not earlier than an end time of an active voltage of the first sub-driving signal, wherein the second driving signal further comprises a third sub-driving signal configured to drive the black particle in the to-display-black microcapsule to be closer to the display side than the white particle and the colored particle in the display phase;

wherein the third sub-driving signal is written into the first electrode on the to-display-black microcapsule after the second sub-driving signal is written into the first electrode on the to-display-black microcapsule, wherein a value and a duration of an active voltage of the third sub-driving signal are the same as those of the second sub-driving signal, and wherein a value and a duration of an active voltage of the third sub-driving signal are the same as those of the second sub-driving signal.

14. The color electronic paper of claim 13, further comprising:

a temperature sensor configured to detect and feed back an environment temperature to the processor to determine by the processor whether the detected environment temperature is within a preset range, wherein the first driving signal is applied to the first electrode on the to-display-white microcapsule when the detected environment temperature is within the preset range.

15. A computer readable medium having a computer program stored therein which, when being executed by a processor, causes the processor to implement the method of claim 1.

* * * * *